(12) United States Patent
Asai et al.

(10) Patent No.: US 11,485,414 B2
(45) Date of Patent: Nov. 1, 2022

(54) CROSSMEMBER AND MANUFACTURING METHOD FOR CROSSMEMBER

(71) Applicant: Toyota Jidosha Kabushiki Kaisha, Toyota (JP)

(72) Inventors: Tetsuya Asai, Miyoshi (JP); Ryuichi Okumoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 363 days.

(21) Appl. No.: 16/532,779

(22) Filed: Aug. 6, 2019

(65) Prior Publication Data

US 2020/0079429 A1 Mar. 12, 2020

(30) Foreign Application Priority Data

Sep. 7, 2018 (JP) .............................. JP2018-167486

(51) Int. Cl.
*B62D 21/03* (2006.01)
*B62D 25/20* (2006.01)

(52) U.S. Cl.
CPC ......... *B62D 21/03* (2013.01); *B62D 25/2036* (2013.01)

(58) Field of Classification Search
CPC ................................ B62D 21/03; B62D 21/11
USPC ........................................................ 296/204
See application file for complete search history.

(56) References Cited

U.S. PATENT DOCUMENTS

| 6,145,365 | A | 11/2000 | Miyahara | |
|---|---|---|---|---|
| 8,141,904 | B2 * | 3/2012 | Akaki | B62D 21/02 180/312 |
| 9,010,849 | B2 * | 4/2015 | Komiya | B62D 21/11 280/124.109 |
| 9,174,681 | B2 * | 11/2015 | Shigihara | B62D 25/08 |
| 2009/0267337 | A1 | 10/2009 | Siekaup et al. | |
| 2017/0066482 | A1 | 3/2017 | Kaneko | |

FOREIGN PATENT DOCUMENTS

| CN | 101565057 A | 10/2009 |
|---|---|---|
| CN | 106494174 A | 3/2017 |
| JP | 11-104746 A | 4/1999 |
| JP | 2004-345466 A | 12/2004 |
| JP | 2004-352022 A | 12/2004 |
| JP | 2007-106162 A | 4/2007 |

* cited by examiner

*Primary Examiner* — Joseph D. Pape
(74) *Attorney, Agent, or Firm* — Dinsmore & Shohl LLP (57) ABSTRACT

A crossmember and a manufacturing method for a crossmember is disclosed. The crossmember is made of a metal sheet having a given sectional shape, configures a part of a vehicle body frame, extends along a vehicle width direction, and has an engine mount attaching portion provided in a part of an upper plate portion. The crossmember has an upper crossmember that is made of a single metal sheet extending along the vehicle width direction, the upper crossmember having a larger thickness in a region including the engine mount attaching portion of the upper plate portion and a surrounding area of the engine mount attaching portion compared to a thickness of a remaining region.

8 Claims, 7 Drawing Sheets

RELATED ART

CROSSMEMBER AND MANUFACTURING METHOD FOR CROSSMEMBER

CROSS-REFERENCE TO RELATED APPLICATIONS

This application claims priority to Japanese Patent Application No. 2018-167486 filed on Sep. 7, 2018, which is incorporated herein by reference in its entirety including the specification, drawings and abstract.

BACKGROUND

1. Technical Field

The disclosure relates to a crossmember and a manufacturing method for a crossmember.

2. Description of Related Art

As a vehicle body frame, a structure including a pair of right and left side rails (also referred to as side frames) extending in a vehicle body front-rear direction and a crossmember that bridges between the side rails is known (referred to as a frame structure). In general, the crossmember is made into a given section structure (for example, a closed section structure) by, for example, pressing a metal sheet (a high-tensile steel plate and so on), and thus obtains high rigidity.

Japanese Unexamined Patent Application Publication No. 2004-352022 (JP 2004-352022 A) discloses a crossmember (a floor crossmember) that is formed to have a hat-shaped section by pressing a metal sheet.

SUMMARY

As disclosed in JP 2004-352022 A, when a crossmember is manufactured by pressing a metal sheet (a metal sheet with a uniform thickness dimension), a thickness dimension becomes uniform throughout the crossmember. This thickness dimension is specified so that a part of the crossmember to which an especially large load is applied has sufficient strength. Therefore, the remaining part (a part to which a relatively small load is applied) has an unnecessarily large thickness dimension. Thus, with the manufacturing method according to the foregoing related art, there is a limit in reducing a weight of a vehicle body by reducing a weight of a crossmember.

Figure 8:
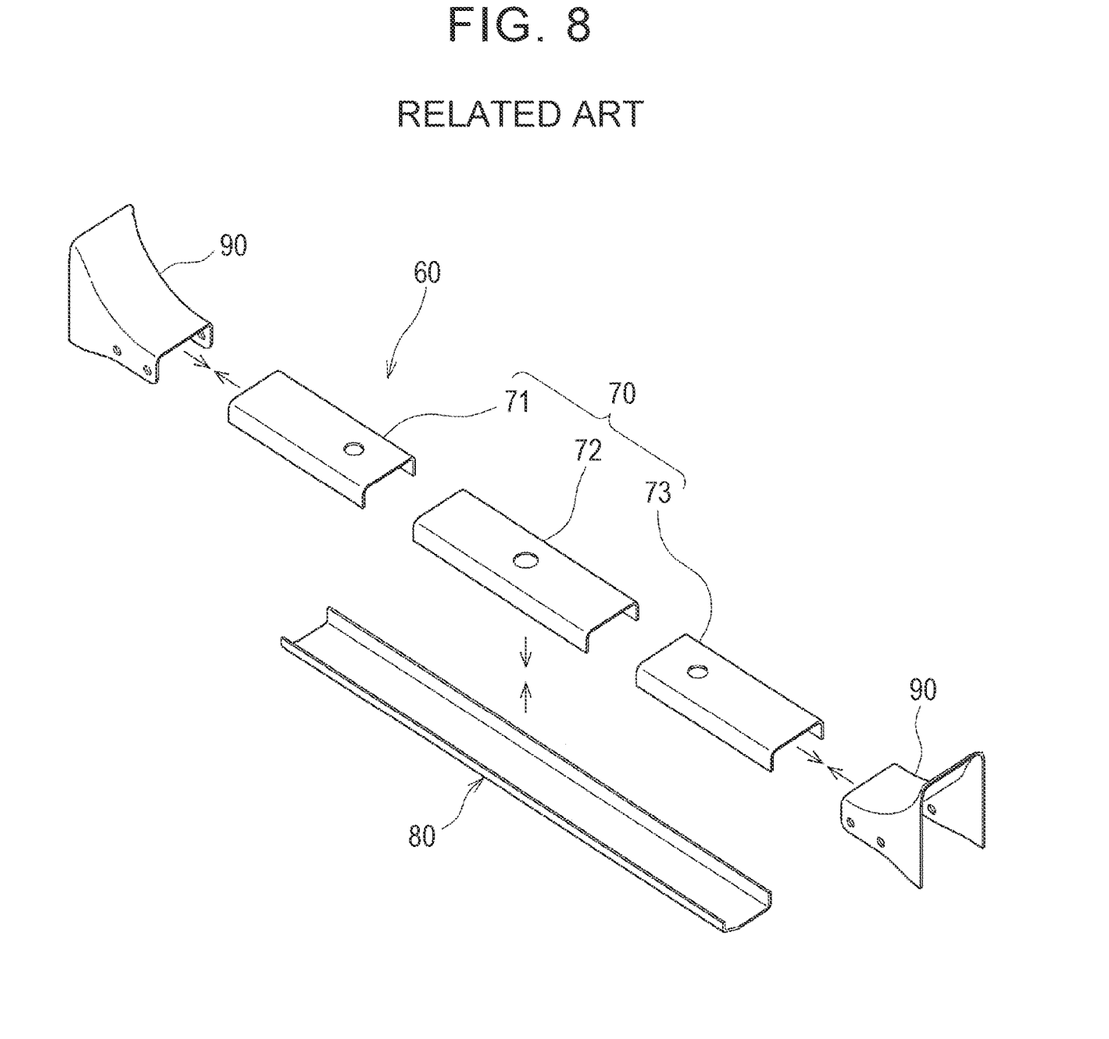
FIG. 8 is a perspective view describing a case where a crossmember is manufactured by integrally welding a plurality of panels having different thickness dimensions from each other.

For a structure to achieve a weight reduction of a crossmember, it is considered to manufacture a crossmember by integrally welding a plurality of panels with different thickness dimensions from each other. For example, as shown in FIG. 8, a crossmember 60 includes an upper-side member 70 and a lower-side member 80. The upper-side member 70 is fabricated by welding a plurality of panels 71, 72, 73 having different thickness dimensions from one another, and the members 70, 80 are integrated with each other by welding. For example, when an engine mount (not shown) is mounted on a center part of the crossmember 60 in a longitudinal direction, a large load (a load in the upper-lower direction that is input from an engine through the engine mount) is applied to a center part of the upper-side member 70 in a vehicle width direction. In this case, a thickness dimension of the panel 72 located in the center is increased, and thickness dimensions of the remaining panels 71, 73 are reduced. By doing so, it is possible to reduce a weight of the crossmember 60 while obtaining sufficient rigidity against the load. Gussets 90 are connected with both sides of the crossmember 60 in the longitudinal direction, respectively, by bolt fastening, and the crossmember 60 is connected with side rails (not shown) through the gussets 90, respectively.

However, when the crossmember 60 is manufactured as described above, the number of parts increases, and the structure may become complex. Also, since welding is necessary at a plurality of places, manufacturing cost may be increased, heat damages may happen at welding locations (a reduction in strength at the welding locations), and rust may be generated (rust may be generated in surrounding areas of the welding locations). Further, since strength of the welding locations (joining parts) is reduced (strength is lowered in comparison with a case where the separated structure is not used), there is a limit in reducing the thickness dimensions (the thickness dimensions of the panels 71, 73). As a result, there is a limit in reducing a weight of the crossmember 60.

The disclosure provides a vehicle body crossmember and a manufacturing method for the crossmember by which a weight reduction is possible while simplifying a structure and reducing welding locations due to a reduction of the number of parts.

A first aspect of the disclosure provides a crossmember that is made of a metal sheet having a given sectional shape, configures a part of a vehicle body frame, extends along a vehicle width direction, and has an engine mount attaching portion provided in a part of an upper plate portion. The crossmember has an upper crossmember that is made of a single metal sheet extending along the vehicle width direction, the upper crossmember having a larger thickness in a region including the engine mount attaching portion of the upper plate portion and a surrounding area of the engine mount attaching portion compared to a thickness of a remaining region.

According to the first aspect, a thick portion and a thin portion are provided in the upper crossmember made of the single metal sheet. A large thickness dimension is set for the thick portion, and a small thickness dimension is set for the thin portion. This means that, in the crossmember, the thick portion configures a region including the engine mount attaching portion of an upper plate portion and a surrounding area of the engine mount attaching portion to which an especially large load is applied. Also, tire thin portion configures a portion to which a relatively small load is applied. Thus, on the single metal sheet, thickness dimensions in accordance with loads applied are obtained. As a result, it is possible to reduce a region where the thickness dimension is unnecessarily large, and the weight of the crossmember is thus reduced. Further, since it is not necessary to integrally weld a plurality of panels having different thickness dimensions from each other (since it is not necessary to use the structure shown in FIG. 8), the number of parts is reduced, and the structure is simplified. Also, because welding locations are reduced, it is possible to reduce manufacturing cost, restrain heat damage, and restrain generation of rust.

In the first aspect, a step portion may be provided in a first surface of the upper crossmember, a shaving mark portion is provided on a second surface of the upper crossmember that is a surface on a back of a region where a thickness is reduced by the step portion and a thick portion is provided on a first side of the upper crossmember in an extending direction of the upper crossmember with respect to the step portion, and a thin portion is provided on a second side of the upper crossmember in the extending direction of the upper crossmember with respect to the step portion. The shaving mark portion may be regarded as a mark of shaving that is formed when a surface portion of the upper crossmember is shaved.

This means that, as the step portion is provided on the first surface of the upper crossmember, and the shaving mark portion is provided on the second surface, it is possible to provide the thick portion (a portion where a thickness reduction due to a step on the first surface is small) and the thin portion (a portion where a thickness reduction due to the step on the first surface is large) in the upper crossmember that is made of the single metal sheet.

In the above configuration, the crossmember may further include a lower crossmember. The crossmember may have a closed section structure that is formed as the upper crossmember and the lower crossmember are joined to each other, the first surface of the upper crossmember on which the step portion provided may face an inner side of the closed section structure, and the second surface of the upper crossmember on which the shaving mark portion is provided may face an outer side of the closed section structure.

When external force is applied to the cross member having the closed section structure, tensile stress is generated an outer-side surface. In that case, when there is the step portion on the outer-side surface, stress can concentrate on the step portion. In view of this, according to this solving means, the step portion is provided on an inner-side surface (the first surface), and the shaving mark portion is provided on the outer-side surface (the second surface) so that the outer-side surface becomes an almost flat surface. Thus, tensile stress does not concentrate on the outer-side surface. Because of this, it is possible to enhance reliability of strength of the crossmember.

A second aspect of the disclosure provides a crossmember including an upper crossmember made of a single metal sheet. The upper crossmember includes a first portion in which an engine mount attaching portion is provided, and a second portion that is adjacent to the first portion and has a thickness smaller than a thickness of the first portion.

In the second aspect, the crossmember may further include a lower crossmember connected with the upper crossmember. The upper crossmember and the lower crossmember may form a closed section.

In the above configuration, the upper crossmember may include a first surface facing an inner side of the closed section, and a second surface facing an outside of the closed section and a step may be made on the first surface between the first portion and the second portion.

In the above configuration, a portion of the second surface corresponding to the step on the first surface may be a flat surface.

In the second aspect, the upper crossmember may include a first side wall portion and a second side wall portion extending in parallel to each other, and an upper wall portion that connects an end portion of the first side wall portion and an end portion of the second side wall portion. The first portion may be positioned within the upper wall portion.

A third aspect of the disclosure provides a manufacturing method for a crossmember, including: pressing a metal sheet so that a recessed portion is formed on a first surface of the metal sheet and a projecting portion is formed on a second surface of the metal sheet; cutting the projecting portion of the metal sheet after the pressing; and bending the metal sheet into a predetermined sectional shape after the cutting.

In the crossmember manufactured with the manufacturing method according to the third aspect, a step portion is formed in an outer edge of a portion of the first surface, the portion being formed into a recessed shape by the pressing. Also, the projecting portion of the second surface is cut in the cutting, and a shaving mark portion is thus formed. Thus, a thick portion is provided on a first side of the metal sheet in an extending direction of the metal sheet with respect to the step portion, and a thin portion is provided on a second side of the metal sheet in the extending direction of the metal sheet with respect to the step portion.

Further, with the crossmember manufactured with the manufacturing method, it is possible to reduce a region where a thickness dimension is unnecessarily large, and it is thus possible to reduce a weight. Also, since it is not necessary to integrally weld a plurality of panels having different thickness dimensions from each other, it is possible to reduce the number of parts, and the structure is simplified. Also, because welding locations are reduced, the manufacturing cost is reduced, heat damage is restrained, and generation of rust is restrained.

In the third aspect, the pressing may include pressing the second surface with a punch in a state where the metal sheet is placed on a base so that the first surface faces an upper surface of the base.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure is described with reference to the drawings, in the embodiment, a case is described where the disclosure is applied to a crossmember of a vehicle body frame that is configured as a so-called ladder frame.

Outline of Structure of Vehicle Body Frame

Figure 1:
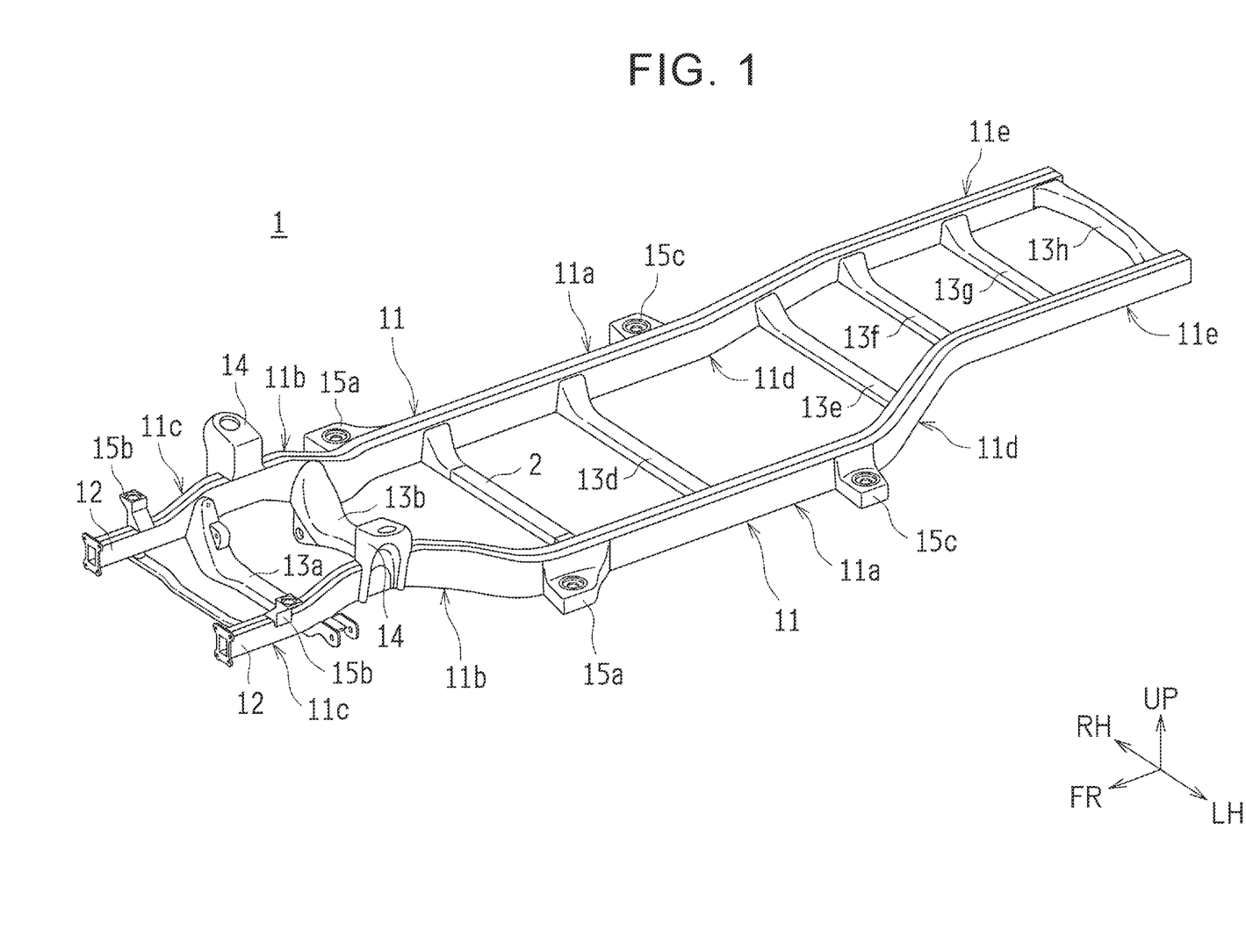
FIG. 1 is a perspective view of a vehicle body frame according to an embodiment.

FIG. 1 is a perspective view of a vehicle body frame 1 according to an embodiment, in FIG. 1, an arrow FR represents a vehicle body front direction, an arrow UP represents an upper direction, an arrow RH represents a vehicle body right direction, and an arrow LH represents a vehicle body left direction.

As shown in FIG. 1, the vehicle body frame 1 is provided with a pair of right and left side rails 11 that extend in a vehicle body front-rear direction on both outer sides in a vehicle width direction, respectively. Each of the side rails 11 has a closed section structure and is provided with an intermediate portion 11a, a front kick-up portion 11b, a front portion 11c, a rear kick-up portion 11d, and a rear portion 11e that are continuous with each other along the vehicle body front-rear direction.

The intermediate portion 11a extends in a horizontal direction along the vehicle body front-rear direction in a given range between a position where a front wheel (not shown) is disposed, and a position where a rear wheel (not shown) is disposed.

The front kick-up portion 11b continues from a front end of the intermediate portion 11a and has a shape that is curved upwardly towards the front of the vehicle body. The front portion 11c continues from a front end of the front kick-up portion 11b and extends towards the front of the vehicle body. The front wheel is disposed on an outer side of the front portion in in the vehicle width direction. Therefore, a dimension of the front portions 11c of the side rails 11 in the vehicle width direction (a dimension between the right and left front portions 11c) is set to be smaller than a dimension of the intermediate portions 11a in the vehicle width direction (a dimension between the right and left intermediate portions 11a, 11a) in consideration of interference with the front wheels. Therefore, the front kick-up portions 11b have a shape that is curved to the outer side in the vehicle width direction towards the rear of the vehicle body.

The rear kick-up portion 11d continues front a rear end of the intermediate portion 11a and has a shape that is curved upwardly towards the rear of the vehicle body. The rear portion 11e continues from a rear end of the rear kick-up portion 11d and extends towards the rear of the vehicle body. The rear wheel is disposed on the outer side of the rear portion 11e in the vehicle width direction. Therefore, a dimension of the rear portions 11e of the side rails 11 in the vehicle width direction (a dimension between the right and left rear portions 11e) is also set so as to be smaller than the dimension of the intermediate portions 11a in the vehicle width direction (the dimension between the right and left intermediate portions 11a) in consideration of interference with the rear wheels. Therefore, the rear kick-up portions 11d have a shape that is curved to the outer side in the vehicle width direction towards the front of the vehicle body.

Crush boxes 12 are provided in front of the front portions 11c of the side rails 11, respectively, so that the crush boxes 12 absorb energy (a collision load) at the time of vehicle frontal collision. A bumper reinforcement (not shown) extending along the vehicle width direction bridges between front end portions of the pair of right and left crush boxes 12.

A plurality of crossmembers 13a, 13b, 13d 13e, 13f, 13g, 13h, 2 extending in the vehicle width direction bridges between the side rails 11. In the drawing, reference numeral 13a represents a first crossmember, reference numeral 13b represents a second crossmember, reference numeral 2 represents a third crossmember, reference numeral 13d represents a fourth crossmember, reference numeral 13e represents a fifth crossmember, reference numeral 13f represents a sixth crossmember, reference numeral 13g represents a seventh crossmember, and reference numeral 13h represents a rear crossmember.

Each of metallic suspension support brackets 14 is disposed at a position of the front portion 11c of the side rail 11 between the first crossmember 13a and the second crossmember 13b. The suspension support bracket 14 protrudes to the outer side in the vehicle width direction.

Further, cab mount brackets 15a, 15b, 15c are disposed in a rear end portion of the front kick-up portion 11b of the side rail 11, a front end portion of the front portion 11c of the side rail 11, and a front end portion of the rear kick-up portion 11d of the side rail 11, respectively. The cab mount brackets 15a, 15b, 15c protrude to the outer side in the vehicle width direction so that cab mounts (not shown) are attached to the cab mount brackets 15a, 15b, 15c, respectively. Thus, a cabin (not shown) can be connected with the side rail 11 through the cab mounts and the cab mount brackets 15a, 15b, 15c.

Structure of the Third Crossmember

A characteristic of the embodiment is a structure of the third crossmember 2 out of the crossmembers 13a, 13b, 13d 13e, 13f, 13g, 13h, 2. This means that the third crossmember 2 is an example of a crossmember according to the disclosure. Hereinafter, the third crossmember 2 is described.

Figure 2:
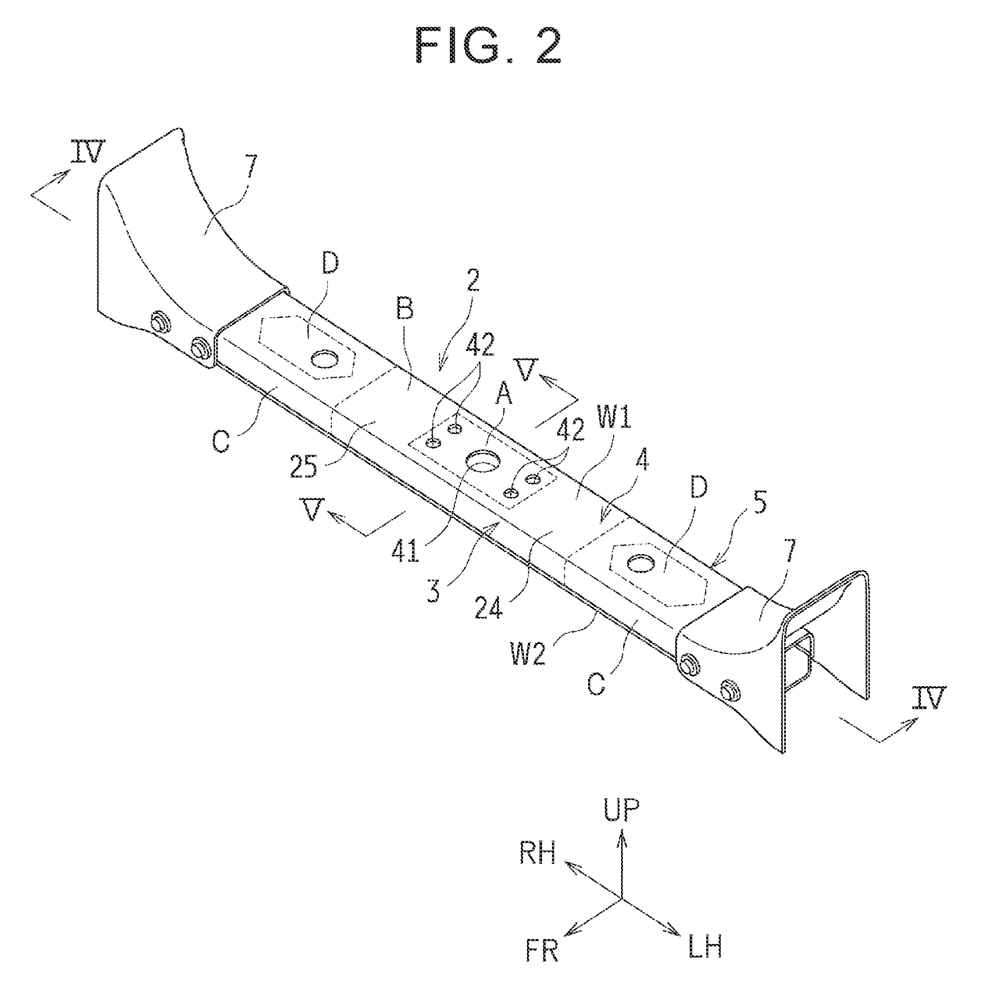
FIG. 2 is a perspective view of a third crossmember seen from an upper left side of a front part of a vehicle body.
Figure 3:
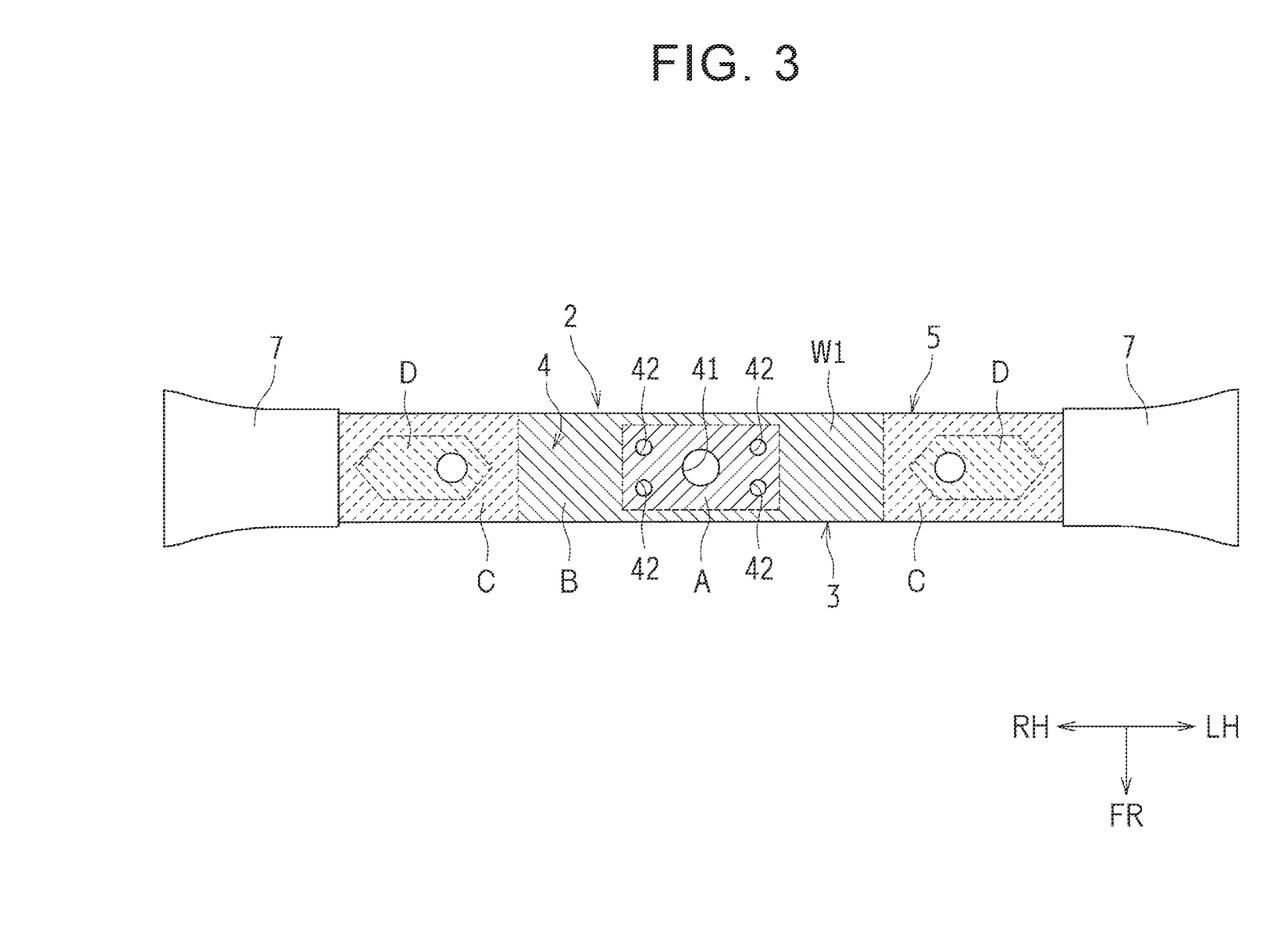
FIG. 3 is a plan view of the third crossmember.
Figure 4:
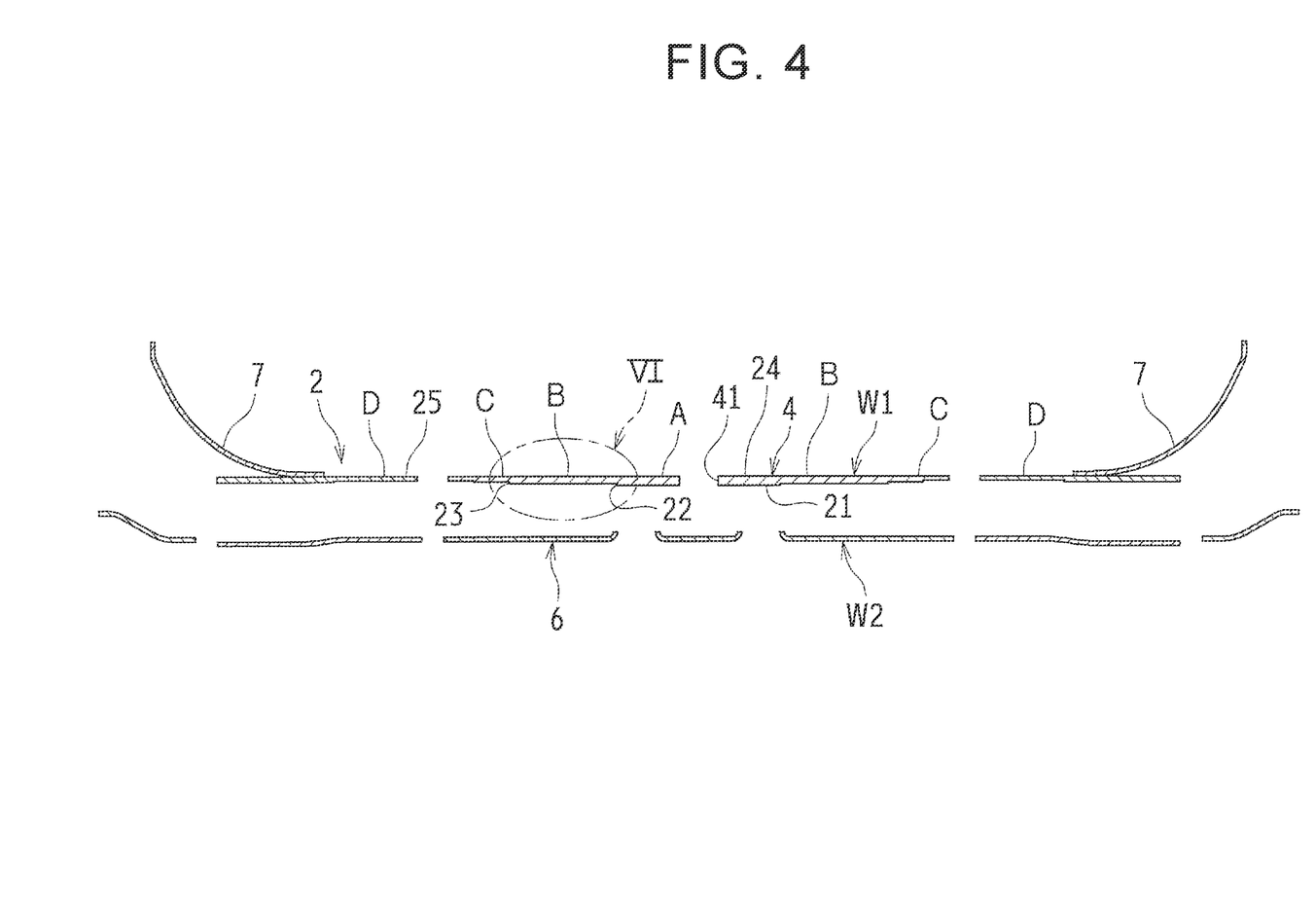
FIG. 4 is a sectional view taken along the line IV-IV in FIG. 2.
Figure 5:
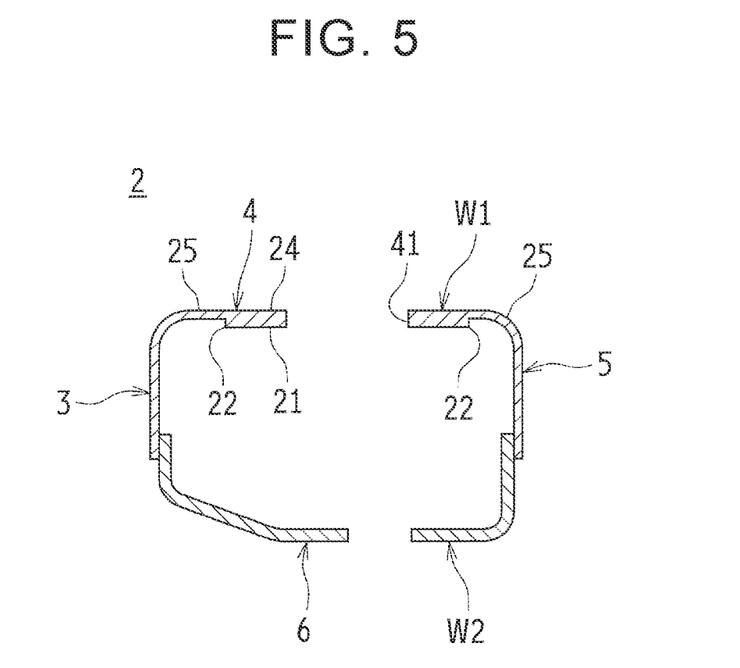
FIG. 5 is a sectional view taken along the line V-V in FIG. 2.

FIG. 2 is a perspective view of the third crossmember 2 seen from a left upper side of a front part of the vehicle body. FIG. 3 is a plan view of the third crossmember 2. In FIG. 2 and FIG. 3, gussets 7 that connect the third crossmember 2 to the side rails 11, respectively, are also shown. Also, in FIG. 2 and FIG. 3, the arrow FR represents the vehicle body front direction, the arrow UP represents the upper direction, the arrow RH represent the vehicle body right direction, and the arrow LH represents the vehicle body left direction. FIG. 4 is a sectional view taken along tire line IV-IV in FIG. 2, FIG. 5 is a sectional view taken along the line V-V in FIG. 2.

The third crossmember 2 is made into a closed section structure having a rectangular section (an example of a given sectional shape in the disclosure) by welding two metal sheets W1, W2. To be specific, the third crossmember 2 is made as an upper crossmember (a metal sheet on an upper side) W1 and a lower crossmember (a metal sheet on a lower side) W2 are joined to each other integrally. The upper crossmember W1 has a sectional shape that is open on the lower side, and the lower crossmember W2 has a sectional shape that is open on the upper side.

Further, the third cross member 2 includes a front wall portion 3, an upper plate portion 4, a rear wall portion 5, and a lower plate portion 6. The front wall portion 3 is positioned on the vehicle body front side, the upper plate portion 4 extends from an upper end edge of the front wall portion 3 to the vehicle body rear side, the rear wall portion 5 extends from a rear end edge (an end edge on the rear side in the vehicle body front-rear direction) of the upper plate portion 4 to the lower side, and the lower plate portion 6 extends from a lower end edge of the rear wall portion 5 to the vehicle body front direction. Thus, the front wall portion 3 and the rear wall portion 5 face each other in the vehicle body front-rear direction. Further, the upper plate portion 4 and the lower plate portion 6 face each other in an upper-lower direction.

In a center part of the upper plate portion 4 in the vehicle width direction, an engine mount insertion hole (an engine mount attaching portion) 41 is formed so as to pass through the upper plate portion 4 in the upper-lower direction so that a lower part of an engine mount (not shown) is inserted into the engine mount insertion hole 41. Further, in order to fasten the engine mount by bolts, bolt insertion holes 42 are formed in a surrounding area of the engine mount insertion hole 41.

Also, the gussets 7 are connected with both sides of the third crossmember 2 in the longitudinal direction by bolts, respectively, and the third crossmember 2 is connected with the side rails 11 through the gussets 7.

Thickness Dimensions of the Third Crossmember

A characteristic of the third crossmember 2 is that a plurality of regions is provided in the upper crossmember W1, and the regions have different thickness dimensions from each other. In the embodiment, four kinds of regions with different thickness dimensions from each other are provided. The region with the largest thickness dimension is referred to as a first region A, the region with the second largest thickness dimension is referred to as a second region B, and the region with the third largest thickness dimension is referred to as a third region C, and the region with the smallest thickness dimension is referred to as a fourth region D.

Figure 6:
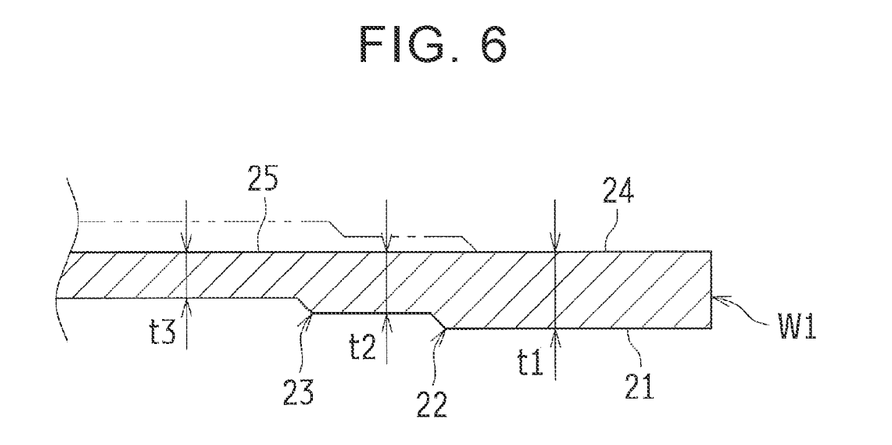
FIG. 6 is an enlarged view of a portion VI in FIG. 4.

As shown in FIG. 6 (an enlarged view of portion VI in FIG. 4), in a structure that provides the regions having different thickness dimensions from each other as described above, step portions 22, 23 are provided by partially recessing an inner-side surface (an example of a first surface of the upper crossmember in the disclosure) 21 of the closed section structure of the third crossmember 2. Meanwhile, an outer-side surface (an example of a second surface of the upper crossmember in the disclosure) 24 of the closed section structure is almost flat. Since the inner-side surface 21 has different recession dimensions, the regions having different thickness dimensions from each other are provided. This means that the thickness dimensions are determined as dimensions (dimensions t1, t2, t3 in FIG. 6) between the outer-side surface 24 and the regions where distances from the outer-side surface 24 are changed by the step portions 22, 23 on the inner-side surface 21. The region with u larger recession dimension (where the thickness is reduced more by the step portions 22, 23) is configured as the region with a smaller thickness dimension. Therefore, a first side of the upper crossmember W1 in the extending direction of the upper crossmember W1 with respect to the step portions 22, 23 (a portion where the thickness is not reduced by the step portions 22, 23) is the region with a relatively large thickness dimension (a thick portion), and a second side of the upper crossmember W1 in the extending direction of the upper crossmember W1 with respect to the step portions 22, 23 (a portion where the thickness is reduced by the step portions 22, 23) is the region with a relatively small thickness dimension (a thin portion).

In FIG. 6, the two step portions 22, 23 are provided. Therefore, a region on the left side and a region on the right side across the step portion 22 on the right side in FIG. 6 have different thickness dimensions. Of these regions, the region on the right side of the step portion 22 is an example of the thick portion of the disclosure (a portion with the thickness dimension t1), and the region on the left side of the step portion 22 is an example of the thin portion of the disclosure (a portion with the thickness dimension t2). Further, a region on the left side and a region on the right side across the step portion 23 on the left side in FIG. 6 also have different thickness dimensions. Of these regions, the region on the right side of the step portion 23 is an example of the thick portion of the disclosure (the portion with the thickness dimension t2), and the region on the left side of the step portion 23 is an example of the thin portion of the disclosure (a region with the thickness dimension t3).

As described earlier, in the embodiment, since the disclosure is applied to the third crossmember 2, the thick portion and the thin portion are provided in the third crossmember 2 (to be more specific, the upper crossmember W1 of the third crossmember 2).

As a manufacturing method for providing the step portions 22, 23 by partially recessing the inner-side surface 21 of the closed section structure of the third crossmember 2, and for making the outer-side surface 24 of the closed section structure almost flat, pressing and shaving of the metal sheet (the metal sheet that serves as the upper crossmember) W1 is carried out. Although details are provided later, pressing is carried out so that the first surface (the inner-side surface 21 of the closed section structure) of the metal sheet W1 is formed into a recessed shape, and that live second surface (the outer-side surface 24 of the closed section structure) is formed into a projecting shape (a shape of the metal sheet W1 when the pressing is finished is shown by a virtual line in FIG. 6). After the pressing is done, shaving is carried out so that the projecting portion of the second surface (the outer-side surface 24 of the closed section structure) of the metal sheet W1 is cut (a shape of the metal sheet W1 when the shaving is finished is shown by a solid line in FIG. 6), and the second surface (the outer-side surface 24 of the closed section structure) is made almost flat. This means that, in the first surface (the inner-side surface 21 of the closed section structure), the recessed portion is kept so as to provide the step portions 22, 23, and the projecting portion of the second surface (the outer-side surface 24 of the closed section structure) is cut so that the second surface is made almost flat. Thus, the forgoing regions having different thickness dimensions from each other are formed in the single metal sheet W1.

When the metal sheet W1 is processed in this way, as the projecting portion of the second surface (the outer-side surface) 24 is cut by the shaving, a shaving mark portion (a shaving mark portion provided on the second surface 24 of the metal sheet W1, the second surface 24 being a surface on the back of the region that is stepped down by the step portions 22, 23) 25 is made in a part of the second surface 24. The shaving mark portion 25 is a portion that shows a cut surface of a portion where the projecting portion is cut, and has a surface shape (surface glossiness, surface roughness, and so on) that is obviously different from the remaining portion (a portion that is not cut). For example, in a case where the surface of the metal sheet W1 is treated, the surface treated layer is removed. In a case where an oxide film is present on the surface of the metal sheet W1, the oxide film is removed. In some cases, a small edge remains in an outer edge portion of the shaving mark portion 25. Further, the shaving mark portion 25 is not necessarily a surface that is perfectly leveled with the remaining portion, and may have a shape that bulges slightly more than the remaining portion (for example, by about 0.1 mm).

In FIG. 3, the regions having different thickness dimensions from each other are hatched with inclined lines so that the regions are distinguished from one another. To be specific, the first region A is hatched with solid lines that are inclined to the bottom left. The second region B is hatched with solid lines that are inclined to the bottom right. The third region C is hatched with broken lines that are inclined to the bottom left. The fourth region D is hatched with broken lines that are inclined to the bottom right. The thickness dimensions of the regions A, B, C, D are, for example, 3.5 mm for the first region A, 3.0 mm for the second region B, 2.5 mm for the third region C, and 2.0 mm for the fourth region D. However, the thickness dimensions are not limited to these values.

Locations Where the Regions are Applied

Next, locations to which the regions A, B, C, D are applied, respectively, are described.

The first region A (the region with the largest thickness dimension among the regions A, B, C, D) is applied to a surrounding area of the engine mount insertion hole 41 and the bolt insertion holes 42 (a portion that serves as a mounting seat for the engine mount) provided in a center part of the upper plate portion 4 in the vehicle width direction. The second region B (the region with the second largest thickness dimension among the regions A, B, C, D) is applied to a portion of the upper plate portion 4 on the outer side of the first region A in the vehicle width direction, a center part of the front wall portion 3 in the vehicle width direction, and a center part of the rear wall portion 5 in the vehicle width direction. The third region C (the region with the third largest thickness dimension among the regions A, B, C, D) is applied to a portion of the upper plate portion 4 on the outer side of the second region B in the vehicle width direction, the portion surrounding the later-described fourth region D, outer parts of the front wall portion 3 on both sides in the vehicle width direction, and outer parts of the rear wall portion 5 on both sides in the vehicle width direction. The fourth region D (the region with the smallest thickness dimension among the regions A, B, C, D) is applied to a center part of the third region C in the upper plate portion 4. As described so far, in the third crossmember 2, the thickness dimension of the region surrounding the engine mount insertion hole 41 into which a lower part of the engine mount is inserted is larger than the thickness dimensions of the remaining regions. Thus, it is possible to enhance strength of the center part in the vehicle width direction where stress tends to be high as a load in the upper-lower direction is input from the engine through the engine mount.

Manufacturing Steps for the Third Crossmember

Next, manufacturing steps for the third crossmember 2 configured as above are described.

As the manufacturing steps for the third crossmember 2, pressing step, shaving step, bending step, and joining step are carried out in this order. In the pressing step, the metal sheet (a metal sheet such as a high-tensile steel plate, serving as the upper crossmember) W1 is pressed. In the shaving step, the metal sheet W1 is shaved. In the bending step, the two metal sheets W1, W2 are bent. In the joining step, the two metal sheets W1, W2 are joined to each other.

FIG. 7A to FIG. 7D are views describing outlines of the manufacturing steps for the third crossmember 2.

Figure 7A:
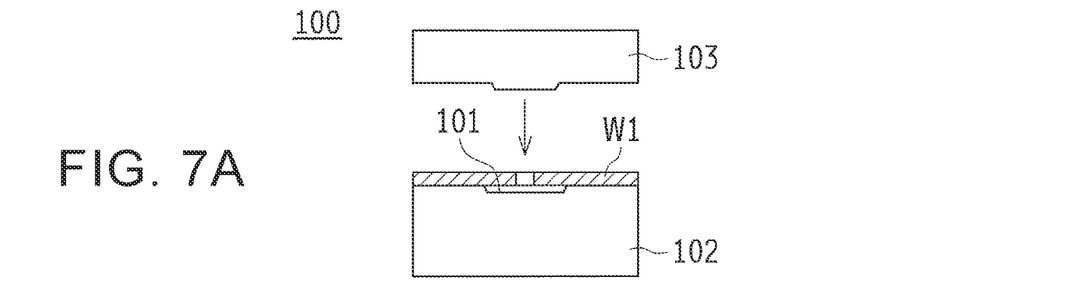
FIG. 7A is a view of a state before pressing a metal sheet in a manufacturing step for the third crossmember.

First of all, the metal sheet W1 that is sheared by a shearing machine (not shown) into a given shape (a long shape) is set on a pressing machine 100 (see FIG. 7A). The pressing machine 100 includes a base 102 on which a die 101 is installed on an upper surface, and a punch 103 that is able to move up and down with respect to the base 102. A mechanism that allows the punch 103 to move up and down is similar to a conventional pressing machine, and description of the mechanism is thus omitted.

Figure 7B:
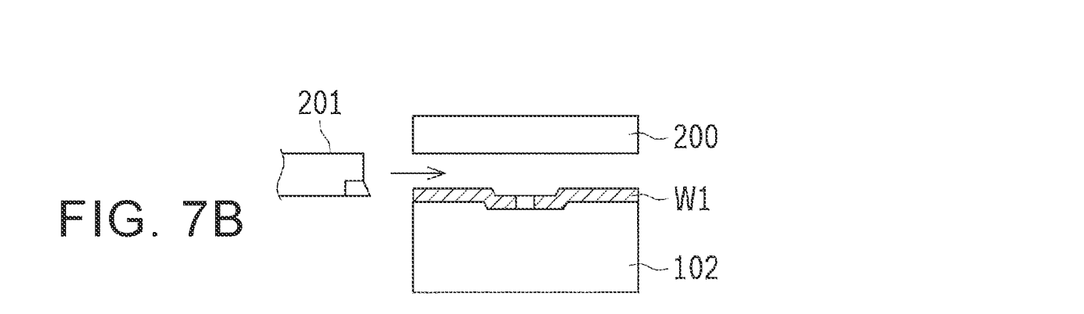
FIG. 7B is a view of a state before shaving in a manufacturing step for the third crossmember after the metal sheet is pressed.

Then, as the punch 103 is moved down towards the metal sheet W1 placed on the base 102 (the pressing step), the projecting portion is formed on the lower surface of the metal sheet W1, and the recessed portion is formed on the upper surface of the metal sheet W1 (see FIG. 7B). Thus, an outer part of the metal sheet W1 in FIG. 7B is stepped down toward the upper side with respect to the center part. This means that the outer part projects to the upper side (becomes the projecting portion). Further, an outer edge of the projecting portion (the projecting portion of the lower surface) obtained by the pressing step will later become the step portions 22, 23.

Further, a recession dimension of the recessed portion is set so as to be smaller than the thickness dimension of the metal sheet W1. Further, the recession dimension of the recessed portion is set in accordance with a thickness dimension (a target thickness dimension) that is to be obtained in the later-described shaving step. Thus, a projection dimension of a projecting portion of the punch 103 and a recession dimension of a recessed portion of the die 101 are set so that the recession dimension of the recessed portion becomes smaller as the target thickness dimension is larger.

Figure 7C:
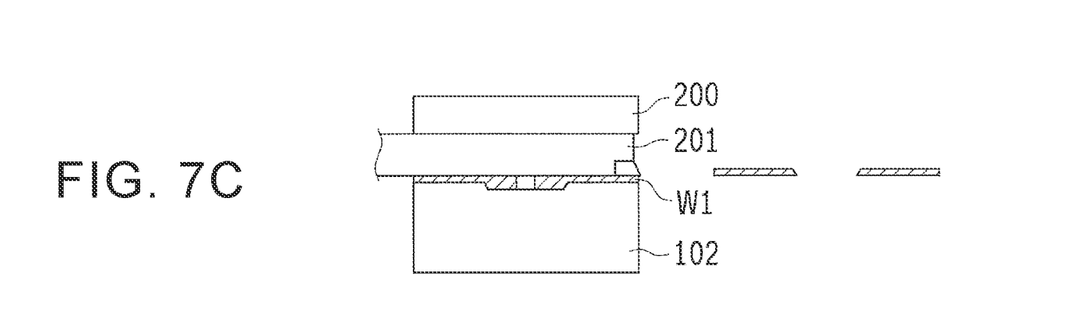
FIG. 7C is a view of a step of cutting a projecting portion of the metal sheet in the shaving in a manufacturing step for the third crossmember.

Thereafter, the metal sheet W1 after the pressing is shaved. In the shaving, the upper surface of the metal sheet W1 is cut into an almost flat shape. Specifically, in a state where the pressed metal sheet W1 is placed on the base 102, the punch 103 is replaced with a pressing jig 200. A lower surface of the pressing jig 200 is a flat surface. Also, the pressing jig 200 is distanced from the base 102 so that there is a space for a shaving tool (a cutting blade) 201 to pass through between the pressing jig 200 and the metal sheet W1. As shown in FIG. 7C, as the cutting blade 201 passes through the space, the outer part (a portion projecting upwardly) of the metal sheet W1 is removed by cutting, and the upper surface of the metal sheet W1 is made into an approximately flat surface. This means that the outer part is cut so as to be almost flush with the upper surface of the center part of the metal sheet W1.

In the metal sheet W1 obtained in the shaving step, the region cut by the cutting blade 201 is processed as the thin portion, and the remaining portion is processed as the thick portion.

In FIG. 7A to FIG. 7D, in order to simplify the description, a case is described in which the thick portion is processed in the center part of the metal sheet W1, and the thin portion is processed on the outer side of the thick portion. However, in reality as described earlier, the four kinds of regions having different thickness dimensions from each other are provided in different places of the third crossmember 2, respectively. Therefore, the punch 103 and the die 101 are fabricated so that these thickness dimensions can be obtained, and more than one place formed during the pressing step is cut by the cutting blade 201.

Figure 7D:
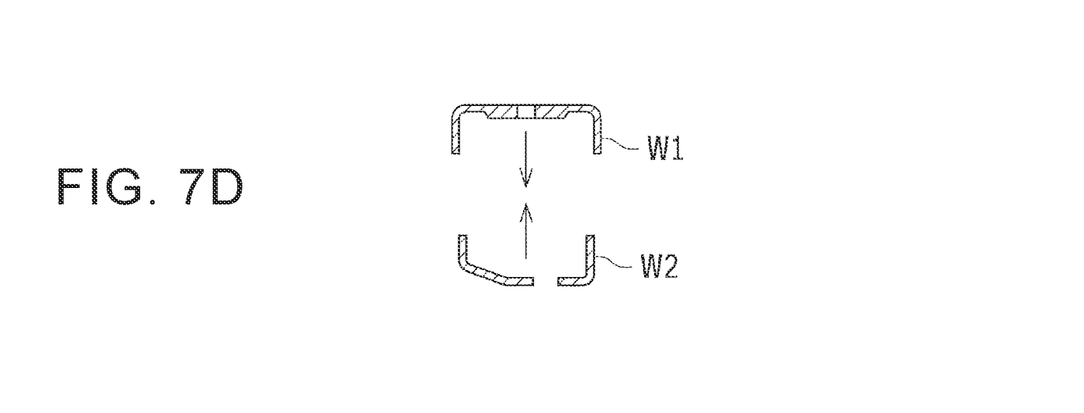
FIG. 7D is a view of a step of joining two bent metal sheets in a manufacturing step for the third crossmember.

The metal sheet (the metal sheet that serves as the upper crossmember) W1 provided with the regions with different thickness dimensions from each other is fabricated as described above, the metal sheet W1 and the other metal sheet (the metal sheet that serves as the lower crossmember) W2 are respectively formed into an angular U-shape by pressing and so on (the bending step), and as shown in FIG. 7D, end edges of the metal sheets W1, W2 are superimposed on top of each other and welded to each other (the joining step). Thus, a closed section having an approximately rectangular shape is made.

Effects of the Embodiment

As described so far, in the embodiment, the step portions 22, 23 are provided on the first surface (the inner-side surface of the closed section structure) 21 of the metal sheet W1, and the shaving mark portion 25 is provided on the second surface (the outer-side surface of the closed section structure) 24. Thus, the thick portion and the thin portion are provided in the single metal sheet W1. This means that, as the third crossmember 2 is manufactured by using the metal sheet W1, a portion of the third crossmember 2 where an especially large load is applied is configured as the thick portion, and a portion of the third crossmember 2 where a relatively small load is applied is configured as the thin portion. Therefore, it is possible that the single metal sheet W1 obtains thickness dimensions corresponding to applied loads, respectively. To be specific, the surrounding area of the engine mount insertion hole 41 and the bolt insertion holes 42 provided in the center part of the third crossmember 2 in the vehicle width direction is configured as the thick portion that has a larger thickness dimension than that of an area adjacent to the surrounding area. As a result, it is possible to reduce a region with an unnecessarily large thickness dimension, and it is thus possible to reduce a weight of the third crossmember 2. Further, because it is nor necessary to integrally weld panels having different thickness dimensions from each other (since it is not necessary to use the structure shown in FIG. 8), it is possible to reduce the number of parts, and the structure is simplified. Also, because welding locations are reduced, it is possible to lower manufacturing cost, restrain heat damage, and restrain generation of rust.

Further, in the embodiment, each of the metal sheets W1, W2 is configured as a single member that spreads across in the vehicle width direction. Therefore, it is possible to configure the third crossmember 2 with the two metal sheets W1, W2 only, and it is thus possible to reduce the number of members that configure the third crossmember 2 (the number of the metal sheets W1, W2 to be used) greatly. Furthermore, when the third crossmember 2 is made of an open section structure, the third crossmember 2 may be configured only with the single metal sheet W1.

Further, in the embodiment, the step portions 22, 23 are provided on the inner-side surface 21 of the closed section structure of the third crossmember 2, and the shaving mark portion 25 is provided on tire outer-side surface 24 so that the outer-side surface 24 becomes almost flat. When external force is applied to the third crossmember 2 of the closed section structure, tensile stress is generated in the outer-side surface 24. In this case, when there are the step portions on the outer-side surface 24, stress may concentrate on the step portions. In view of this, in this embodiment, the step portions 22, 23 are provided on the inner-side surface 21, and the shaving mark portion 25 is provided on the outer-side surface 24 so that the outer-side surface 24 is formed into an almost flat surface. Thus, tensile stress does not concentrate on the outer-side surface 24. Hence, it is possible to increase reliability of strength of the third crossmember 2.

Other Embodiments

The claims are not limited to the embodiment, and all modifications and applications are possible as long as they are within the scope of claims and a scope equivalent to it.

For example, in the embodiment, the case is described where the disclosure is applied to the third crossmember 2 out of the crossmembers 13*a*, 13*b*, 13*d*, 13*e*, 13*f*, 13*g*, 13*h*, 2. However, the claims are not limited to this, and may be applied to another crossmember on which the engine mount is mounted.

Also, in the embodiment, the third crossmember 2 is described that is provided with the four kinds of regions having different thickness dimensions from each other. However, the claims are not limited to this, and the third crossmember may have three kinds of regions or less with different thickness dimensions from each other, or the third crossmember may have five kinds of regions or more having different thickness dimensions from each other. Further, locations where these regions are arranged, and shapes of these regions are not limited to those in the embodiment and may be set as appropriate.

Further, in the embodiment, the surface of the metal sheet W1 where the step portions 22, 23 are provided serves as the inner-side surface of the closed section structure of the third crossmember 2, and the flat surface of the metal sheet W1 serves as the outer-side surface the closed section structure of the third crossmember 2. The claims are not limited to this, and the surface of the meal sheet where the step portions are provided may be the outer-side surface of the closed section structure of the third crossmember 2, and the flat surface of the metal sheet may be the inner-side surface of the closed section structure of the third crossmember 2.

Further, in the embodiment, an open-side end edge of the metal sheet W1 that serves as the upper crossmember and an open-side end edge of the metal sheet W2 that serves as the lower crossmember are partially superimposed and welded to each other, which is called lap welding, thereby manufacturing the third crossmember 2 having the closed section structure. However, the claims are not limited to this, and the metal sheets W1, W2 may be superimposed so as to face each other and welded, thereby manufacturing the third crossmember 2 having the closed section structure.

Further, in the embodiment, the pressing step is carried out by using the base 102 having the die 101 serving as the recessed portion. However, the pressing step may be carried out by using a base having a projecting portion on an upper surface. In this case, the projecting portion is formed on the upper surface of the metal sheet W1, and the recessed portion is formed on the lower surface of the metal sheet W1 by the pressing step. This means that the projecting portion is provided in the center part of the upper surface of the metal sheet W1. As the projecting portion on the upper surface of the metal sheet W1 is removed by cutting, a metal sheet is fabricated in which a thin portion is made in the center part, and the remaining portion (the outer part) has a thick portion.

Further, in the disclosure, a 3D metal printer (a powder bed fusion, and a metal deposition, and so on) may be used as means for manufacturing the third crossmember 2 having the structure described earlier.

The disclosure is applicable to a crossmember applied to a vehicle body frame of a frame structure. The disclosure is also applicable to a manufacturing method for a crossmember.

What is claimed is:

1. A crossmember that is made of a metal sheet having a given sectional shape, configures a part of a vehicle body frame, extends along a vehicle width direction, and has an engine mount attaching portion provided in a part of an upper plate portion wherein
    the crossmember has an upper crossmember that is made of a single metal sheet extending along the vehicle width direction, the upper crossmember having a larger thickness in a region including the engine mount attaching portion of the upper plate portion and a surrounding area of the engine mount attaching portion compared to a thickness of a remaining region.

2. The crossmember according to claim 1, wherein:
    a step portion is provided in a first surface of the upper crossmember;
    a shaving mark portion is provided on a second surface of the upper crossmember that is a surface on a back of a region where a thickness is reduced by the step portion; and a thick portion is provided on a first side of the upper crossmember in an extending direction of the upper crossmember with respect to the step portion, and a thin portion is provided on a second side of the upper crossmember in the extending direction of the upper crossmember with respect to the step portion.

3. The crossmember according to claim 2 further comprising
a lower crossmember, wherein:
the crossmember has a closed section structure that is formed as the upper crossmember and the lower crossmember are joined to each other;
the first surface of the upper crossmember on which the step portion is provided faces an inner side of the closed section structure; and
the second surface of the upper crossmember on which the shaving mark portion is provided faces an outer side of the closed section structure.

4. A crossmember comprising an upper crossmember made of a single metal sheet, the upper crossmember including
a first portion in which an engine mount attaching portion is provided, and
a second portion that is adjacent to the first portion and has a thickness smaller than a thickness of the first portion.

5. The crossmember according to claim 4 further comprising
a lower crossmember connected with the upper crossmember, wherein the upper crossmember and the lower crossmember form a closed section.

6. The crossmember according to claim 5, wherein:
the upper crossmember includes a first surface facing an inner side of the closed section, and a second surface facing an outside of the closed section; and
a step portion is made on the first surface between the first portion and the second portion.

7. The crossmember according to claim 6, wherein a portion of the second surface corresponding to the step portion on the first surface is a flat surface.

8. The crossmember according to claim 4, wherein:
the upper crossmember includes a first side wall portion and a second side wall portion extending in parallel to each other, and an upper wall portion that connects an end portion of the first side wall portion and an end portion of the second side wall portion; and
the first portion is positioned within the upper wall portion.

* * * * *